United States Patent [19]

Imai et al.

[11] Patent Number: 4,948,864

[45] Date of Patent: Aug. 14, 1990

[54] CATALYTIC METHOD FOR MANUFACTURING AROMATIC POLYESTER RESIN FROM AROMATIC DIOL, AROMATIC DIBROMIDE AND CARBON MONOXIDE

[75] Inventors: Yoshio Imai, Tokyo; Masa-Aki Kakimoto, Yokohama; Masaru Yoneyama, Tokyo, all of Japan

[73] Assignee: Tosoh Corporation, Shinnanyo, Japan

[21] Appl. No.: 400,143

[22] Filed: Aug. 28, 1989

[30] Foreign Application Priority Data

Aug. 26, 1988 [JP] Japan ................... 63-210590

[51] Int. Cl.$^5$ ............................................. C08G 63/78
[52] U.S. Cl. ................... 528/219; 528/171; 528/174; 528/205
[58] Field of Search ............ 528/219, 171, 174, 205

[56] References Cited

PUBLICATIONS

"Novel Synthesis of Aromatic Polyamides by Palladium-Catalyzed Polycondensation of Aromatic Dibromides, Aromatic Diamines, and Carbon Monoxide", Masaru Yoneyama et al., *Macromolecules*, 1988, 21, 1908–1911.

*Primary Examiner*—Harold D. Anderson
*Attorney, Agent, or Firm*—Oblon, Spivak, McClelland, Maier & Neustadt

[57] ABSTRACT

A process for manufacturing an aromatic polyester resin represented by the general formula:

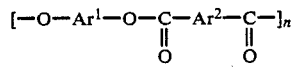

wherein $Ar^1$ and $Ar^2$ represent a bivalent aromatic radical and n is an integer of 10 to 100, comprising reacting an aromatic diol represented by the general formula:

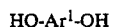

wherein $Ar^1$ is a bivalent aromatic radical with a bivalent dibromide represented by the general formula:

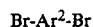

where $Ar^2$ is a bivalent radical and with carbon monoxide in the presence of a palladium catalyst and an organic base in an organic solvent.

19 Claims, No Drawings

CATALYTIC METHOD FOR MANUFACTURING AROMATIC POLYESTER RESIN FROM AROMATIC DIOL, AROMATIC DIBROMIDE AND CARBON MONOXIDE

BACKGROUND OF THE INVENTION

1. Field of the Invention:

The present invention relates to a method for manufacturing an aromatic polyester resin.

2. Description of the Related Art:

Aromatic polyester resins have extensively been used as industrial materials because of their excellent heat-resistance, high strength, and high modulus. A known manufacturing method thereof is polycondensation of a combination of, for example, an aromatic diol and an aromatic dicarboxylic chloride; an aromatic diol and an aromatic dicarboxylic ester; acetate esters of an aromatic diol and an aromatic dicarboxylic acid, and the like in an organic solvent.

This method has the advantages of difficulty in handling of unstable aromatic dicarboxylic chloride, high cost of the polyester resins resulting from the expensive starting materials, and the high temperature necessary for the transesterification.

SUMMARY OF THE INVENTION

The present inventors have comprehensively investigated methods for manufacturing an aromatic polyester resin starting from stable, easy-to-handle, and inexpensive starting materials, and have accomplished the present invention.

The present invention provides a method for manufacturing an aromatic polyester resin represented of the general formula:

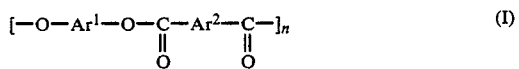

wherein $Ar^1$ is a bivalent aromatic radical which may be, for example, one selected from the group of

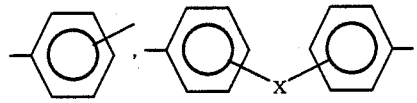

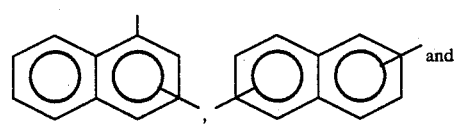

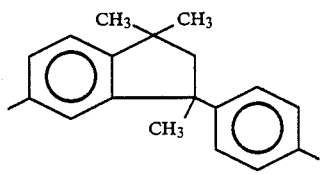

provided that X is

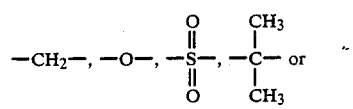

or X may be absent (single bond);

$Ar^2$ is a bivalent aromatic radical which may be, for example, one selected from the group of

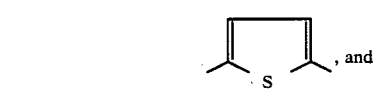

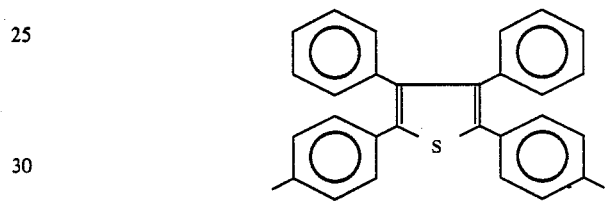

provided that X is —CH$_2$— or —O—; and n is an integer of 10 to 100, comprising a reaction of an aromatic diol represented by the general formula:

$$HO-Ar^1-OH \quad (II)$$

wherein $Ar^1$ is a bivalent aromatic radical which may be, for example, one selected from the group of

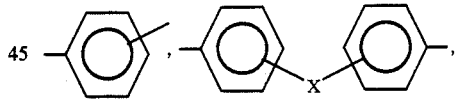

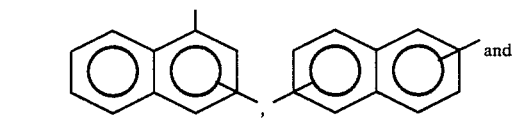

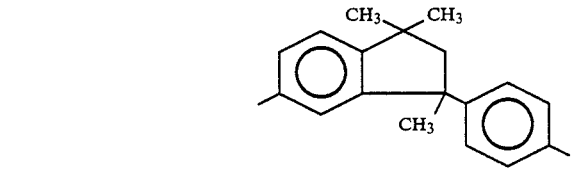

provided that X is

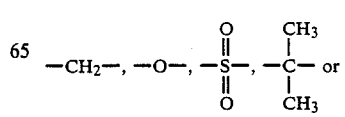

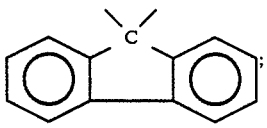

or X may be absent;
with an aromatic dibromide represented by the general formula:

$$Br-Ar^2-Br \quad (III)$$

wherein $Ar^2$ is a bivalent radical which may be, for example, one selected from the group of

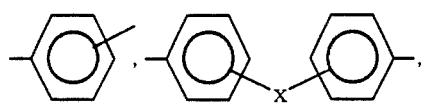

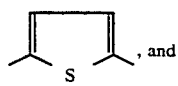, and

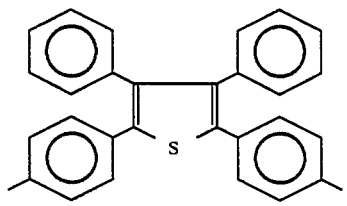

provided that X is —CH$_2$—, or —O—; and
carbon monoxide in the presence of a palladium catalyst and an organic base in an organic solvent.

DETAILED DESCRIPTION OF THE PREFERRED EMBODIMENTS

The present invention is described below in more detail. The typical aromatic diols represented by the above general formula (II) include resorcinol, hydroquinone, 9,9-bis(4-hydroxyphenyl)fluorene, 2,2-bis(4-hydroxyphenyl)propane, bis(4-hydroxyphenyl) ether, bis(4-hydroxyphenyl)methane, bis(4-hydroxyphenyl)sulfone, 3-(4-hydroxyphenyl)-1,1,3-trimethyl-5-indanol, 1,4-naphthalenediol, 1,5-naphthalenediol, 2,6-naphthalenediol, 4,4'-dihydroxybiphenyl, etc. Other aromatic diols and diol mixtures, however, may also be used.

The typical aromatic dibromides represented by the above general formula (III) include m-dibromobenzene, p-dibromobenzene, bis(3-bromophenyl)methane, bis(4-bromophenyl)methane, 1-bromo-3-(4-bromobenzyl)benzene, bis(3-bromophenyl) ether, bis-(4-bromophenyl) ether, 1-bromo-3-(4-bromophenoxy)benzene, 2,5-dibromothiophene, 2,5-bis(4-bromophenyl)-3,4-diphenylthiophene, etc. Other aromatic dibromides and dibromide mixtures, however, may also be used. Although an aromatic diiodide may be used in place of an aromatic dibromide, the aromatic diiodides are expensive, so that their use is not profitable from an economical point of view.

The organic bases include aprotic amine bases, for example imines and tertiary amines, such as tributylamine, 4-dimethylaminopyridine, 1,8-diazabicyclo[5.4.0]undec-7-ene (DBU), 1,5-diazabicyclo[4.3.0]non-5-ene, 1,4-diazabicyclo [2.2.2]octane, and the like.

The aromatic polyester resin represented by the general formula (I) is manufactured through the reaction of an aromatic diol of the general formula (II), an aromatic dibromide of the general formula (III), and carbon monoxide in the presence of a palladium catalyst and an organic base in an organic solvent. The specific examples of the organic solvents employed are amide type solvents such as dimethylformamide, dimethylacetamide, N-methyl-2-pyrrolidone, tetramethylurea, and hexamethylphosphoramide; aromatic solvents such as benzene, toluene, xylene, nitrobenzene, benzonitrile, and chlorobenzene; ether type solvents such as dibutyl ether, tetrahydrofuran, dioxane, and di(methoxyethyl) ether; and dimethyl sulfoxide, pyridine, etc.

The palladium catalysts employed in the present invention are exemplified by halides, organic acid salts, and inorganic acid salts of palladium. Specifically, the examples are palladium acetate, palladium chloride, palladium bromide, palladium iodide, palladium sulfate, and complexes of these palladium componds with phosphine compounds such as dichlorobis(triphenylphosphine)palladium, dibromobis(triphenylphosphine)palladium, diiodobis(triphenylphosphine)palladium, dichlorobis(tritolylphosphine)palladium, dibromobis(tritolylphosphine)palladium, diiodobis(tritolylphosphine)palladium, chlorophenylbis(triphenylphosphine)palladium, bromophenylbis(triphenylphosphine)palladium, and tetrakis(triphenylphosphine) palladium.

The amount of the palladium catalyst to be used is in the range of from 0.01 mole % to 10 mole %, preferably from 0.1 mole % to 5 mole % based on the aromatic diol and the aromatic dibromide. Combined use of triphenylphosphine with the palladium catalyst frequently gives favorable results. Triphenylphosphine is generally used in amounts of about 1 to 10 moles, preferably 2 to 5 moles per mole of catalyst used.

The amount of carbon monoxide to be used in the present invention is twice that of aromatic diol and the aromatic dibromide in molar ratio, but a larger amount is generally employed.

The aromatic polyester resin represented by the above general formula (I) is manufactured by reacting an aromatic diol of the general formula (II), an aromatic dibromide of the general formula (III), and carbon monoxide in the presence of a palladium catalyst and an organic base in an organic solvent. Specifically, an aromatic diol, an aromatic dibromide, a palladium catalyst, and an organic base are first dissolved in an organic solvent. The solution is made to react by agitating in an atmosphere of carbon monoxide at a temperature from about 50° C. to about 250° C., preferably 80° C. to 200° C. As the reaction proceeds, the viscosity of the reaction mixture increases. The agitation is continued usually for 3 hours to 24 hours; in some case, the reaction goes to completion within an hour. The reaction mixture is treated with methanol, acetone, water or the like to separate the aromatic polyester resin after the completion of the reaction.

The polymerization degree n is limited to be within the range of from 10 to 100 in the above formula (I) because with n of 10 or less, the polymer does not exhibit satisfactory properties while with n of 100 or more the polymer has disadvantages in solubility and other properties.

Other features of the invention will become apparent in the course of the following descriptions of exemplary embodiments which are given for illustration of the invention and are not intended to be limiting thereof.

EXAMPLES

EXAMPLE 1

In 10 ml of chlorobenzene, 0.8200 g (2.5 mmol) of bis(4-bromophenyl) ether, 0.5707 g (2.5 mmol) of 2,2-bis(4-hydroxyphenyl)propane, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.5 hours. The resulting solution was diluted with 40 ml of chlorobenzene, and was poured into 450 ml of methanol to obtain a polyester which was washed with hot methanol.

Yield: 1.1163 g (99%)
Reduced Viscosity: 0.51 dl/g (in o-chlorophenol at a concentration of 0.5 g/dl at 30° C.)
Elemental analysis
Calculated: C: 77.32%, H: 4.92%;
Found: C: 75.44%, H: 4.79%.

EXAMPLE 2

In 10 ml of chlorobenzene, 0.5898 g (2.5 mmol) of 1,4-dibromobenzene, 0.5707 g (2.5 mmol) of 2,2-bis(4-hydroxyphenyl)propane, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.5 hours. The resulting solution was diluted with 40 ml of chlorobenzene, and was poured into 450 ml of methanol to obtain a polyester which was washed with hot methanol.

Yield: 0.8928 g (100%)
Reduced Viscosity: 0.32 dl/g (in o-chlorophenol at a concentration of 0.5 g/dl at 30° C.)

EXAMPLE 3

In 10 ml of chlorobenzene, 0.5898 g (2.5 mmol) of 1,3-dibromobenzene, 0.5707 g (2.5 mmol) of 2,2-bis(4-hydroxyphenyl)propane, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.5 hours. The resulting solution was diluted with 40 ml of chlorobenzene, and was poured into 450 ml of methanol to obtain a polyester which was washed with hot methanol.

Yield: 0.8062 g (90%)
Reduced Viscosity: 0.20 dl/g (in o-chlorophenol at a concentration of 0.5 g/dl at 30° C.)

EXAMPLE 4

In 10 ml of chlorobenzene, 1.3658 g (2.5 mmol) of 2,5-bis(4-bromophenyl)-3,4-diphenylthiophene, 0.5707 g (2.5 mmol) of 2,2-bis(4-hydroxyphenyl)propane, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.7 hours. The resulting solution was diluted with 40 ml of chlorobenzene, and was poured into 450 ml of methanol to obtain a polyester which was washed with hot methanol.

Yield: 1.6553 g (99%)
Reduced Viscosity: 0.50 dl/g (in o-chlorophenol at a concentration of 0.5 g/dl at 30° C.)

EXAMPLE 5

In 10 ml of chlorobenzene, 0.2949 g (1.25 mmol) of 1,3-dibromobenzene, 0.2949 g (1.25 mmol) of 1,4-dibromobenzene, 0.5707 g (2.5 mmol) of 2,2-bis(4-hydroxyphenyl)propane, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 2.1 hours. The resulting solution was diluted with 40 ml of chlorobenzene, and was poured into 450 ml of methanol to obtain a polyester which was washed with hot methanol.

Yield: 0.7305 g (82%)
Reduced Viscosity: 0.30 dl/g (in o-chlorophenol at a concentration of 0.5 g/dl at 30° C.)

EXAMPLE 6

In 10 ml of chlorobenzene, 0.6049 g (2.5 mmol) of 2,5-dibromothiophene, 0.5707 g (2.5 mmol) of 2,2-bis(4-hydroxyphenyl)propane, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 17.5 hours. The resulting solution was diluted with 40 ml of chlorobenzene, and was poured into 450 ml of methanol to obtain a polyester which was washed with hot methanol.

Yield: 0.5512 g (61%)
Reduced Viscosity: 0.18 dl/g (in o-chlorophenol at a concentration of 0.5 g/dl at 30° C.)

EXAMPLE 7

In 10 ml of chlorobenzene, 0.8200 g (2.5 mmol) of bis(4-bromophenyl) ether, 0.2753 g (2.5 mmol) of resorcinol, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.5 hours. The resulting solution was diluted with 40 ml of chlorobenzene, and was poured into 450 ml of methanol to obtain a polyester which was washed with hot methanol.

Yield: 0.7878 g (95%)
Reduced Viscosity: 0.35 dl/g (in o-chlorophenol at a concentration of 0.5 g/dl at 30° C.)

EXAMPLE 8

In 10 ml of chlorobenzene, 0.5898 g (2.5 mmol) of 1,3-dibromobenzene, 0.2753 g (2.5 mmol) of resorcinol, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 2.6 hours. The resulting solution was diluted with 40 ml of chlorobenzene, and was poured into 450 ml of methanol to obtain a polyester which was washed with hot methanol.
Yield: 0.4807 g (80%)
The polymer thus obtained was insoluble in solvents, and its reduced viscosity could not be determined.

EXAMPLE 9

In 10 ml of chlorobenzene, 0.5898 g (2.5 mmol) of 1,4-dibromobenzene, 0.2753 g (2.5 mmol) of resorcinol, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 2.6 hours. The resulting solution was diluted with 40 ml of chlorobenzene, and was poured into 450 ml of methanol to obtain a polyester which was washed with hot methanol.
Yield: 0.4242 g (71%)
The polymer thus obtained was insoluble in solvents, and its reduced viscosity could not be determined.

EXAMPLE 10

In 10 ml of chlorobenzene, 0.2949 g (1.25 mmol) of 1,3-dibromobenzene, 0.2949 g (1.25 mmol) of 1,4-dibromobenzene, 0.2753 g (2.5 mmol) of resorcinol, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 2.6 hours. The resulting solution was diluted with 40 ml of chlorobenzene, and was poured into 450 ml of methanol to obtain a polyester which was washed with hot methanol.
Yield: 0.4668 g (78%)
Reduced Viscosity: 0.17 dl/g (in o-chlorophenol at a concentration of 0.5 g/dl at 30° C.)

EXAMPLE 11

In 10 ml of chlorobenzene, 1.3658 g (2.5 mmol) of 2,5-bis(4-bromophenyl)-3,4-diphenylthiophene, 0.2753 g (2.5 mmol) of resorcinol, 0.8373 g (5.5 mmol) of 1,8-diazabicyclo[5.4.0]undec-7-ene, 0.0702 g (0.10 mmol) of dichlorobis(triphenylphosphine)palladium, 0.0525 g (0.20 mmol) of triphenylphosphine were dissolved, and were agitated in an atmosphere of carbon monoxide at a pressure of 1 atmosphere at 115° C. for 1.5 hours. The resulting solution was diluted with 40 ml of chlorobenzene, and was poured into 450 ml of methanol to obtain a polyester which was washed with hot methanol.
Yield: 1.3628 g (99%)
Reduced Viscosity: 0.39 dl/g (in o-chlorophenol at a concentration of 0.5 g/dl at 30° C.)

EXAMPLE 12

In 10 ml of chlorobenzene, 0.8200 g (2.5 mmol) of bis(4-bromophenyl) ether, 0.8760 g (2.5 mmol) of 9,9-bis(4-hydroxyphenyl)fluorene, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.9 hours. The resulting solution was diluted with 40 ml of chlorobenzene, and was poured into 450 ml of methanol to obtain a polyester which was washed with hot methanol.
Yield: 1.4172 g (99%)
Reduced Viscosity: 0.42 dl/g (in o-chlorophenol at a concentration of 0.5 g/dl at 30° C.)

EXAMPLE 13

In 10 ml of chlorobenzene, 0.5898 g (2.5 mmol) of 1,3-dibromobenzene, 0.8760 g (2.5 mmol) of 9,9-bis(4-hydroxyphenyl)fluorene, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.8 hours. The resulting solution was diluted with 40 ml of chlorobenzene, and was poured into 450 ml of methanol to obtain a polyester which was washed with hot methanol.
Yield: 1.0981 g (91%)
Reduced Viscosity: 0.18 dl/g (in o-chlorophenol at a concentration of 0.5 g/dl at 30° C.)

Example 14

In 10 ml of chlorobenzene, 0.5898 g (2.5 mmol) of 1,4-dibromobenzene, 0.8760 g (2.5 mmol) of 9,9-bis(4-hydroxyphenyl)fluorene, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.8 hours. The resulting solution was diluted with 40 ml of chlorobenzene, and was poured into 450 ml of methanol to obtain a polyester which was washed with hot methanol.
Yield: 1.1431 g (95%)
Reduced Viscosity: 0.27 dl/g (in o-chlorophenol at a concentration of 0.5 g/dl at 30° C.)

EXAMPLE 15

In 10 ml of chlorobenzene, 0.2949 g (1.25 mmol) of 1,3-dibromobenzene, 0.2949 g (1.25 mmol) of 1,4-dibromobenzene, 0.8760 g (2.5 mmol) of 9,9-bis(4-hydroxyphenyl)fluorene, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 2.0 hours. The resulting solution was diluted with 40 ml of chlorobenzene, and was poured into 450 ml of methanol to obtain a polyester which was washed with hot methanol.
Yield: 1.1118 g (93%)
Reduced Viscosity: 0.23 dl/g (in o-chlorophenol at a concentration of 0.5 g/dl at 30° C.)

EXAMPLE 16

In 10 ml of chlorobenzene, 1.3658 g (2.5 mmol) of 2,5-bis(4-bromophenyl)-3,4-diphenylthiophene, 0.8760 g (2.5 mmol) of 9,9-bis(4-hydroxyphenyl)fluorene, 0.8373 g (5.5 mmol) of 1,8-diazabicyclo[5.4.0]undec-7-ene, 0.0702 g (0.10 mmol) of dichlorobis(triphenylphosphine)palladium, 0.0525 g (0.20 mmol) of triphenylphosphine were dissolved, and were agitated in an atmosphere of carbon monoxide at a pressure of 1 atmosphere at 115° C. for 1.9 hours. The resulting solution was diluted with 40 ml of chlorobenzene, and was poured into 450 ml of methanol to obtain a polyester which was washed with hot methanol.
Yield: 1.9576 g (99%)

Reduced Viscosity: 0.54 dl/g (in o-chlorophenol at a concentration of 0.5 g/dl at 30° C.)

EXAMPLE 17

In 10 ml of chlorobenzene, 0.8200 g (2.5 mmol) of bis(4-bromophenyl) ether, 0.6709 g (2.5 mmol) of 1,1,3-trimethyl-3-(4-hydroxyphenyl)-5-indanol, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.6 hours. The resulting solution was diluted with 40 ml of chlorobenzene, and was poured into 450 ml of methanol to obtain a polyester which was washed with hot methanol.
Yield: 1.1770 g (96%)
Reduced Viscosity: 0.34 dl/g (in o-chlorophenol at a concentration of 0.5 g/dl at 30° C.)

Example 18

In 10 ml of chlorobenzene, 0.5898 g (2.5 mmol) of 1,3-dibromobenzene, 0.6709 g (2.5 mmol) of 1,1,3-trimethyl-3-(4-hydroxyphenyl)-5-indanol, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.8 hours. The resulting solution was diluted with 40 ml of chlorobenzene, and was poured into 450 ml of methanol to obtain a polyester which was washed with hot methanol.
Yield: 0.7593 g (76%)
Reduced Viscosity: 0.19 dl/g (in o-chlorophenol at a concentration of 0.5 g/dl at 30° C.)

Example 19

In 10 ml of chlorobenzene, 0.5898 g (2.5 mmol) of 1,4-dibromobenzene, 0.6709 g (2.5 mmol) of 1,1,3-trimethyl-3-(4-hydroxyphenyl)-5-indanol, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.3 hours. The resulting solution was diluted with 40 ml of chlorobenzene, and was poured into 450 ml of methanol to obtain a polyester which was washed with hot methanol.
Yield: 0.8353 g (84%)
Reduced Viscosity: 0.23 dl/g (in o-chlorophenol at a concentration of 0.5 g/dl at 30° C.)

Example 20

In 10 ml of chlorobenzene, 0.2949 g (1.25 mmol) of 1,3-dibromobenzene, 0.2949 g (1.25 mmol) of 1,4-dibromobenzene, 0.6709 g (2.5 mmol) of 1,1,3-trimethyl3-(4-hydroxyphenyl)-5-indanol, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 2.3 hours. The resulting solution was diluted with 40 ml of chlorobenzene, and was poured into 450 ml of methanol to obtain a polyester which was washed with hot methanol.
Yield: 0.8678 g (87%)
Reduced Viscosity: 0.21 dl/g (in o-chlorophenol at a concentration of 0.5 g/dl at 30° C.)

EXAMPLE 21

In 10 ml of chlorobenzene, 1.3658 g (2.5 mmol) of 2,5-bis(4-bromophenyl)-3,4-diphenylthiophene, 0.6709 g (2.5 mmol) of 1,1,3-trimethyl-3-(4-hydroxyphenyl)-5-indanol, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.3 hours. The resulting solution was diluted with 40 ml of chlorobenzene, and was poured into 450 ml of methanol to obtain a polyester which was washed with hot methanol.
Yield: 1.7448 g (98%]
Reduced Viscosity: 0.34 dl/g (in o-chlorophenol at a concentration of 0.5 g/dl at 30° C.)

EXAMPLE 22

In 10 ml of chlorobenzene, 0.8200 g (2.5 mmol) of bis(4-bromophenyl)ether, 0.5055 g (2.5 mmol) of bis(4-hydroxyphenyl)ether, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.8 hours. The resulting solution was diluted with 40 ml of chlorobenzene, and was poured into 450 ml of methanol to obtain a polyester which was washed with hot methanol.
Yield: 1.0368 g (98%)
Reduced Viscosity: 0.08 dl/g (in o-chlorophenol at a concentration of 0.5 g/dl at 30° C.)

EXAMPLE 23

In 10 ml of chlorobenzene, 0.5898 g (2.5 mmol) of 1,3-dibromobenzene, 0.5055 g (2.5 mmol) of bis(4-hydroxyphenyl)ether, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.7 hours. The resulting solution was diluted with 40 ml of chlorobenzene, and was poured into 450 ml of methanol to obtain a polyester which was washed with hot methanol.
Yield: 0.8129 g (98%)
The resulting polymer was insoluble in solvents, and thus the reduced viscosity of the polymer could not be determined.

EXAMPLE 24

In 10 ml of chlorobenzene, 0.5898 g (2.5 mmol) of 1,4-dibromobenzene, 0.5055 g (2.5 mmol) of bis(4-hydroxyphenyl)ether, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 2.3 hours. The resulting solution was diluted with 40 ml of chlorobenzene, and was poured into 450 ml of methanol to obtain a polyester which was washed with hot methanol.
Yield: 0.7190 g (87%)

The resulting polymer was insoluble in solvents, and thus the reduced viscosity of the polymer could not be determined.

EXAMPLE 25

In 10 ml of chlorobenzene, 0.2949 g (1.25 mmol) of 1,3-dibromobenzene, 0.2949 g (1.25 mmol) of 1,4-dibromobenzene, 0.5055 g (2.5 mmol) of bis(4-hydroxyphenyl) ether, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 2.9 hours. The resulting solution was diluted with 40 ml of chlorobenzene, and was poured into 450 ml of methanol to obtain a polyester which was washed with hot methanol.
Yield: 0.7326 g (88%)

The resulting polymer was insoluble in solvents, and thus the reduced viscosity of the polymer could not be determined.

EXAMPLE 26

In 10 ml of chlorobenzene, 1.3658 g (2.5 mmol) of 2,5-bis(4-bromophenyl)-3,4-diphenylthiophene, 0.5055 g (2.5 mmol) of bis(4-hydroxyphenyl)ether, 0.8373 g (5.5 mmol) of 1,8-diazabicyclo[5.4.0]undec-7-ene, 0.0702 g (0.10 mmol) of dichlorobis(triphenylphosphine)palladium, and 0.0525 g (0.20 mmol) of triphenylphosphine were dissolved, and were agitated in an atmosphere of carbon monoxide at a pressure of 1 atmosphere at 115° C. for 1.3 hours. The resulting solution was diluted with 40 ml of chlorobenzene, and was poured into 450 ml of methanol to obtain a polyester which was washed with hot methanol.
Yield: 1.5908 g (99 %)
Reduced Viscosity: 0.69 dl/g (in o-chlorophenol at a concentration of 0.5 g/dl at 30° C.)

The process of the present invention is highly useful because the aromatic dibromides employed instead of the conventional aromatic dicarboxylic chlorides are stable and easily handled which facilitate the operations in purification of the starting materials and practice of the polymerization, and enables the economical manufacture of polyester resins.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for manufacturing an aromatic polyester resin having the formula:

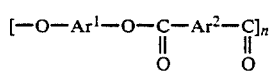

wherein Ar¹ and Ar² are a bivalent aromatic radical and n is an integer between 10 and 100, comprising:
reacting an aromatic diol biphenol having the formula:

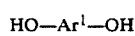

wherein Ar¹ is a bivalent aromatic radical, with a bivalent dibromide having the formula:

wherein Ar² is a bivalent aromatic radical, with carbon monoxide in the presence of a palladium catalyst and an organic base in an organic solvent.

2. The process according to claim 1, wherein Ar¹ is selected from the group consisting of

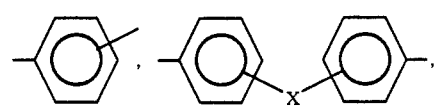

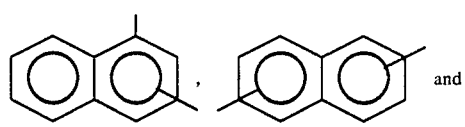

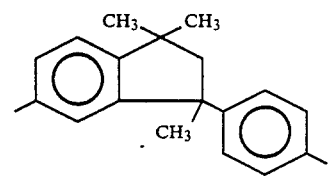

wherein X is

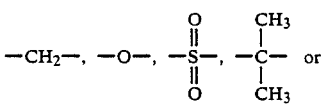

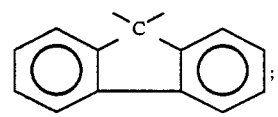

or X is a single bond.

3. The process according to claim 1, wherein said aromatic diol is one selected from the group consisting of resorcinol, hydroquinone, 9,9-bis(4-hydroxyphenyl)fluorene, 2,2-bis(4-hydroxyphenyl)propane, bis(4-hydroxyphenyl) ether, bis(4-hydroxyphenyl)methane, bis(4-hydroxyphenyl) sulfone, 3-(4-hydroxyphenyl)1,1,3-trimethyl-5-indanol, 1,4-naphthalenediol, 1,5-naphthalenediol, 2,6-naphthalenediol, and 4,4'-dihydroxybiphenyl.

4. The process according to claim 1, wherein Ar² is selected from the group consisting of

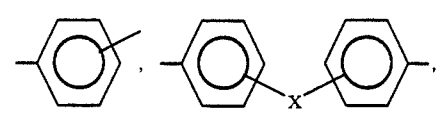

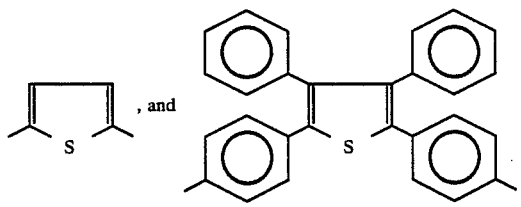

wherein X is —CH₂— or —O—.

5. The process according to claim 1, wherein said aromatic dibromide is one selected from the group consisting of m-dibromobenzene, p-dibromobenzene, bis(3-bromophenyl)methane, bis(4-bromophenyl)methane, 1-bromo-3-(4-bromobenzyl)benzene, bis(3-bromophenyl) ether, bis-(4-bromophenyl) ether, 1-bromo-3-(4-bromophenoxy)benzene, 2,5-dibromothiophene, and 2,5-bis(4-bromophenyl)-3,4-diphenylthiophene.

6. The process according to claim 1, wherein said organic base is an aprotic amine base.

7. The process of claim 6, wherein said organic base is an imine or tertiary amine.

8. The process according to claim 1, wherein said organic base is one selected from the group consisting of tributylamine, 4-dimethylaminopyridine, 1,8-diazabicyclo[5.4.0]undec-7-ene, 1,5-diazabicyclo[4.3.0]-non-5-ene, and 1,4-diazabicyclo[2.2.2]octane.

9. The processss according to claim 1, wherein said organic solvent is an amide, aromatic or ether solvent.

10. The process according to claim 1, wherein said organic solvent is one selected from the group consisting of dimethylformamide, dimethylacetamide, N-methyl-2-pyrrolidone, tetramethylurea, hexamethylphosphoramide, benzene, toluene, xylene, nitrobenzene, benzonitrile, chlorobenzene, dibutyl ether, tetrahydrofuran, dioxane, di(methoxyethyl) ether, dimethyl sulfoxide, and pyridine.

11. The process according to claim 1, wherein said palladium catalyst is a halide, organic acid salt or inorganic acid salt of palladium.

12. The process according to claim 1, wherein said palladium catalyst is one selected from the group consisting of palladium acetate, palladium chloride, palladium bromide, palladium iodide, palladium sulfate, and complexes of these palladium compounds with phosphine compounds.

13. The process of claim 12, wherein said complex is selected from the group consisting of dichlorobis(triphenylphosphine)palladium, dibromobis(triphenylphosphine)palladium, diiodobis(triphenylphosphine)palladium, dichlorobis(tritolylphosphine)palladium, dibromobis(tritolylphosphine)palladium, diiodobis(tritolylphosphine)palladium, chlorophenylbis(triphenylphosphine)palladium, bromophenylbis(triphenylphosphine)palladium and tetrakis(triphenylphosphine) palladium.

14. The process according to claim 1, wherein said palladium catalyst is used in an amount ranging from 0.01 to 10 mole % of the aromatic diol and the aromatic dibromide.

15. The process according to claim 1, wherein said carbon monoxide is used in an amount at least twice the molar amount of the aromatic diol and the dibromide.

16. The process according to claim 1, further comprising reacting said aromatic diol, bivalent dibromide, and carbon monoxide in the presence of triphenylphosphine.

17. The process according to claim 16, wherein said triphenylphosphine is present in an amount of about 1–10 moles per mole of catalyst.

18. The process according to claim 14, wherein said palladium catalyst is used in an amount ranging from 0.1 to 5 mole %.

19. The process according to claim 1, wherein said reacting step is conducted at a temperature from about 50° C. to about 250° C.

* * * * *